US012595624B2

(12) United States Patent
Hellström et al.

(10) Patent No.: US 12,595,624 B2
(45) Date of Patent: Apr. 7, 2026

(54) WATER AND AIR SEPARATION DEVICE FOR REMOVING AIR FROM A WHITEWATER SPRAY

(71) Applicant: VALMET AB, Sundsvall (SE)

(72) Inventors: Lars Hellström, Karlstad (SE); Ruben Wetind, Alnö (SE)

(73) Assignee: VALMET AB, Sundsvall (SE)

( * ) Notice: Subject to any disclaimer, the term of this patent is extended or adjusted under 35 U.S.C. 154(b) by 241 days.

(21) Appl. No.: 18/554,673

(22) PCT Filed: Apr. 21, 2022

(86) PCT No.: PCT/EP2022/060513
§ 371 (c)(1),
(2) Date: Oct. 10, 2023

(87) PCT Pub. No.: WO2022/238089
PCT Pub. Date: Nov. 17, 2022

(65) Prior Publication Data
US 2024/0183106 A1     Jun. 6, 2024

(30) Foreign Application Priority Data

May 12, 2021    (SE) .................................... 2150607-6

(51) Int. Cl.
*D21F 1/66*        (2006.01)
*B01D 19/00*       (2006.01)
(52) U.S. Cl.
CPC ........... *D21F 1/66* (2013.01); *B01D 19/0042* (2013.01)
(58) Field of Classification Search
CPC ............................... D21F 1/66; B01D 19/0042
See application file for complete search history.

(56) References Cited

U.S. PATENT DOCUMENTS 3,007,542 A * 11/1961  Giampapa .......... B01D 19/0052
                                                              96/195
4,583,998 A *  4/1986  Reid .................. B01D 19/0042
                                                             210/801
(Continued)

FOREIGN PATENT DOCUMENTS

SE             540340 C2      7/2018

OTHER PUBLICATIONS

International Search Report and Written Opinion for International Application No. PCT/EP2022/060513, dated Oct. 19, 2022, (11 pages), European Patent Office, Rijswijk, Netherlands.

*Primary Examiner* — Abbas Rashid
*Assistant Examiner* — Stephen M Russell
(74) *Attorney, Agent, or Firm* — Alston & Bird LLP

(57) ABSTRACT

The present invention relates to a water and air separation device (100) comprising—an entry portion (10) having a receiving inlet (11), —a guide portion (20) comprising—a housing (24), —a separation chamber (40), —an inlet (21), —a plurality of guide channels (12) for transporting whitewater spray into the separation chamber, —a liquid outlet (22), —a gas outlet (23), and wherein the guide portion (20) further comprises—a first separation plate (41) arranged to divide the separation chamber (40) into a first section (A) and a second section (B), so that a connecting passage (46) is formed for allowing whitewater to pass into the second section (B) underneath the first separation plate (41) and thereby separate the whitewater from air of the whitewater spray.

20 Claims, 8 Drawing Sheets

(56)         References Cited

U.S. PATENT DOCUMENTS

Figure 1:
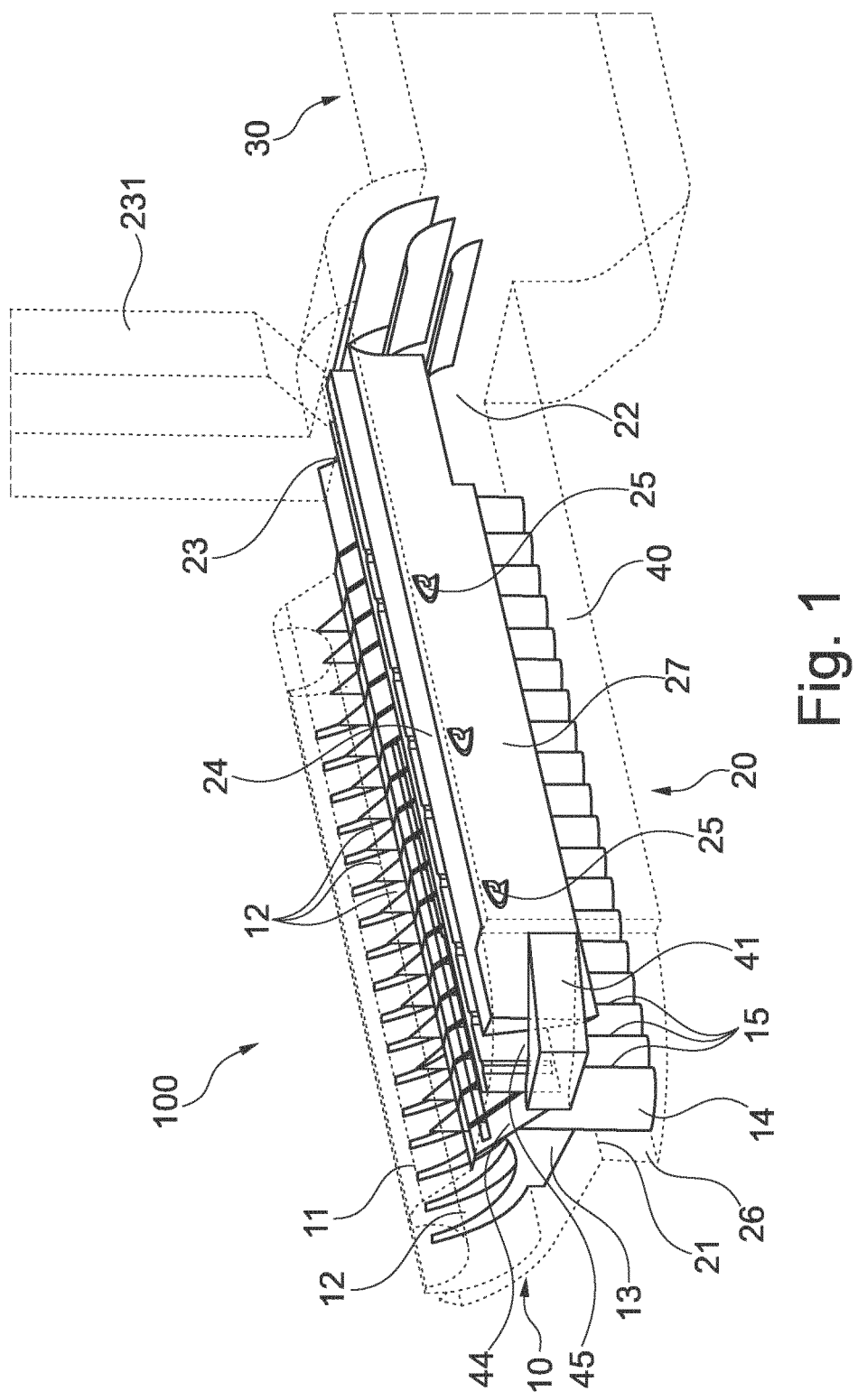

| | | | | |
|---|---|---|---|---|
| 5,268,077 A | * | 12/1993 | Bubik | ............... B01D 19/0047 |
| | | | | 96/197 |
| 2003/0015304 A1 | * | 1/2003 | Beuermann | ........ B01D 19/0047 |
| | | | | 96/182 |

* cited by examiner

WATER AND AIR SEPARATION DEVICE FOR REMOVING AIR FROM A WHITEWATER SPRAY

CROSS REFERENCE TO RELATED APPLICATIONS

This application is a National Stage Application, filed under 35 U.S.C. § 371, of International Application No. PCT/EP2022/060513, filed Apr. 21, 2022, which international application claims priority to and the benefit of Swedish Application No. 2150607-6, filed May 12, 2021; the contents of both of which as are hereby incorporated by reference in their entireties.

TECHNICAL FIELD

The present invention relates to a water and air separation device for removing air from a whitewater spray ejected from a forming wire in a forming section of a paper machine. The invention also relates to a paper machine comprising such a water and air separation device.

BACKGROUND

Paper, tissue, board and other products are often fabricated from a suspension (e.g. of cellulose in water). Such a suspension may be described as a stock. A forming section of a paper machine for making tissue, paper or board typically includes a headbox that injects stock between a loop of forming wire (e.g. a porous wire mesh or cloth) driven around a lead roll, and a loop of fabric (e.g. a felt or another forming wire), which is typically driven around a forming roll. Forces applied to the stock (e.g. via the headbox, the forming wire, the fabric, or the rolls) cause the water to pass through the forming wire, trapping the suspended material on the wire to form a web (e.g. of cellulose) between the forming wire and the fabric. Water from the stock, commonly referred to as whitewater, is ejected through the forming wire. This jet or spray of whitewater is typically gathered and reused.

To reuse this spray of ejected whitewater, large amounts of entrained air need to be removed from the water. Typically, the spray is decelerated and gathered to form a flowing stream of liquid water in a so-called flume. The flume typically comprises a relatively long channel (often several meters long) through which the water flows relatively slowly so that air bubbles can rise to the surface prior to reuse of the water. The flume and adjacent structures that aim to calm the water and allow air bubbles to escape is typically referred to as a calming section.

In some paper machines, a turbine is provided for recovering energy from the whitewater ejected from the forming section. This is advantageous from the energy efficiency standpoint but also suffers from the drawback that larger quantities of air is mixed into the whitewater so that calming the whitewater in the flume of a calming section is rendered more cumbersome.

When handling whitewater spray, an entry portion is typically provided for receiving whitewater spray from the forming section and optionally from a turbine arranged between the entry portion and the forming section. Whitewater is then admitted from the entry portion through a plurality of channels into a guide section where it is deflected in order to decelerate the whitewater and discharge it through an outlet into the calming section. By the deceleration provided in the guide section, calming of whitewater in the flume is improved. There are some known prior art that provide a guide section that seeks to further improve calming of the whitewater by separating air from the whitewater spray so that air removal in the calming section is rendered easier and more efficient. However, one problem with the prior art is that the separation of air is inefficient or even that the design of guide sections risks mixing the air more thoroughly with the whitewater so that calming the whitewater is rendered more inefficient and cumbersome. This is a particular problem where a turbine is used to recover energy from the whitewater, since operation of the turbine causes a larger air stream that follows the whitewater into the entry portion and that risks being mixed into the whitewater in the guide portion.

There is therefore a need for improvements within this area.

SUMMARY

The object of the present invention is to eliminate or at least to minimize the problems discussed above. This is achieved by a water and air separation device and a paper machine comprising such a water and air separation device according to the appended independent claims.

The water and air separation device is suitable for removing air from a whitewater spray ejected from a forming wire in a forming section of a paper machine. The water and air separation device comprises an entry portion having a receiving inlet for receiving whitewater spray comprising whitewater and air, and also comprises a guide portion for guiding whitewater from the entry portion to a calming section. The guide portion comprises a housing, a separation chamber in the housing and an inlet in a front side of the housing. Also, the guide portion comprises a plurality of guide channels that extend from the receiving inlet of the entry portion into the separation chamber through the inlet of the guide portion for transporting whitewater spray into the separation chamber. Each of the plurality of channels comprises a deflected downstream portion for deflecting the whitewater spray.

The guide portion also comprises a liquid outlet connected to the housing for discharging whitewater from the separation chamber, and a gas outlet connected to the housing for allowing air to escape from the separation chamber. Furthermore, the guide portion also comprises a first separation plate arranged to extend from an upper end of the separation chamber downwards into the separation chamber and to divide the separation chamber into a first section adjacent to the front side and a second section adjacent to a rear side that is opposite to the front side. The first separation plate has a first height along a vertical axis that is smaller than a chamber height along the vertical axis of the separation chamber so that a connecting passage is formed for allowing whitewater to pass into the second section underneath the first separation plate and thereby separate the whitewater from air of the whitewater spray.

A main advantage of the present invention is that the first separation plate is provided in the above-described way so that whitewater is admitted into the second section while air is largely prevented from entering the second section and instead remains in the first section. Since whitewater has a higher density than the air in the whitewater spray, the entry into the separation chamber through the guide channels causes the whitewater to flow along a lower part of the guide channels whereas air instead flows above the whitewater. The separation plate then serves to block the air from entering the second section to a large degree so that mixing of the air with the whitewater inside the guide portion is prevented. This allows for an efficient removal of air though the gas outlet, whereas the whitewater is allowed to exit through the liquid outlet and reach the calming section. By thereby decreasing the amount of air that is mixed into the whitewater, calming of the whitewater downstream of the guide portion in the calming section is rendered more efficient.

Suitably, the first height of the first separation plate is 0.5-0.9 times the chamber height, preferably 0.6-0.7 times the chamber height. Thereby, a connecting passage of suitable height is achieved so that the whitewater of the whitewater spray is allowed to pass into the second section while at the same time preventing most of the air of the whitewater spray that is not mixed with the whitewater from passing to the second section. This is advantageous in ensuring a separation of whitewater form air.

Also, the first separation plate may have a front face facing the front side of the separation chamber, wherein said front face extends at a first angle in relation to a vertical axis, said first angle being in a range of 5-45°, preferably 10-20°. Thereby, wear and damage to the first separation plate caused by whitewater hitting the separation plate may be reduced and ensure a longer lifetime and more reliable operation of the first separation plate.

The separation chamber may also have an average width from the front side to the rear side, and the second section may have a width of 0.05-0.6 times the average width of the separation chamber. This is beneficial in allowing for suitable dimensions of the second section so that the whitewater may be accommodated there.

Also, the guide portion may comprise a second separation plate that is arranged from an upper end of the separation chamber to extend downwards into the first section, the second separation plate further extending across an upper portion of outlets of the guide channels along the front side. Thereby, whitewater may be more efficiently guided towards the passage underneath the first separation plate.

Suitably, the second separation plate comprises a plurality of plate openings for admitting air through the second separation plate. Thereby, air may be more efficiently separated from the whitewater by allowing air that passes in upper parts of the guide channels to enter through the second separation plate and thus decrease the risk of this air being mixed into the whitewater.

Also, at least some of the plurality of plate openings may be adjustable. This is advantageous in allowing for adjusting a flow of air inside the guide portion by admitting larger or smaller quantities of air into the openings of the second separation plate.

Suitably, the second separation plate has a second height along the vertical axis that is smaller than the first height of the first separation plate. Thereby, passing of the whitewater underneath the second separation plate is facilitated and so that wear on the second separation plate is decreased.

The guide portion may further comprise a sealing plate arranged from an upper side of the separation chamber to extend downwards into the first section and to join the second separation plate to form a third section delimited by the second separation plate, the sealing plate and preferably also an upper end of the separation chamber, and the third section may be in fluid communication with the gas outlet. This is advantageous in allowing for air that has entered into the third section to exit the guide portion through the gas outlet without risking a further mixing of this air with the whitewater.

Also, the third section may comprise a drain for draining whitewater from the third section, said drain preferably being arranged at a distance from the inlet of the guide section. This allows for any whitewater that may have ended up in the third section to be drained in a convenient and reliable way.

Suitably, the sealing plate further comprises a plurality of second plate openings for admitting air into the third section. This allows for air in the first section to also enter the third section so that removal of air through the gas outlet is rendered more efficient.

Each of the guide channels may have a guide channel width in an upstream portion in the entry portion, and the deflected downstream portion of each channel may be formed by a deflected portion of a guide channel wall in the downstream portion that is deflected in a transversal direction at least the guide channel width. Thereby, it is ensured that whitewater that enters the guide channel across the entire width of the channel comes into contact with the deflected portion so that the whitewater is deflected. The deflection in turn is beneficial in allowing a more convenient passage of the whitewater towards the liquid outlet.

The plurality of guide channels may be formed by a plurality of plates that are spaced apart from each other. This is an efficient and reliable way of ensuring that guide channels are formed for transporting whitewater spray into the guide portion.

Alternatively, the plurality of guide channels may be formed by a plurality of pipes or tubes. This is an efficient and reliable way of providing the guide channels and of transporting the whitewater spray into the guide portion.

Suitably, the housing of the guide portion further comprises at least one additional inlet in the second section of the separation chamber for introducing additional whitewater from outside the housing into the separation chamber. Thereby, whitewater that is not able to enter the receiving inlet of the entry portion and instead ends up on top of the housing of the guide portion may be introduced into the guide portion in a reliable and convenient way.

Suitably, a turbine may also be arranged in connection with the receiving inlet of the entry portion so that whitewater spray that passes the turbine is received by the receiving inlet. This is advantageous in enabling recovery of energy from the whitewater and serves to keep energy consumption of manufacturing paper, tissue or board low.

Also, the first separation plate may be attached to a rear plate that extends from a lower end of the first separation plate to the upper end of the separation chamber, and the rear plate may be curved. This is advantageous in ensuring a steady flow of the whitewater that has entered the second section and been deflected upwards by the rear wall of the separation chamber so that the whitewater may be guided back down again in order to control turbulence of the whitewater and without causing undue wear on the first separation plate.

Furthermore, the separation chamber may have a first end and a second end, said first end being adjacent to the inlet, and the liquid outlet and the gas outlet may be closer to the second end than to the first end. The first separation plate may further extend across the separation chamber from the first end towards the second end at least to the gas outlet or even past the gas outlet. This is advantageous in preventing whitewater from being mixed with the air in the first section or third section so that separation of whitewater and air is rendered more reliable.

Suitably, the water and air separation device also comprises a calming portion connected to the liquid outlet of the guide portion such that whitewater that is discharged through the liquid outlet enters the calming portion. This is advantageous in allowing a calming of the whitewater that has passed from the guide portion so that any air mixed into the whitewater may be allowed to escape as air bubbles from the calming section.

The present invention also relates to a paper machine comprising at least one water and air separation device.

Many additional benefits and advantages of the present invention will be readily understood by the skilled person in view of the detailed description below.

DRAWINGS

Figure 2:
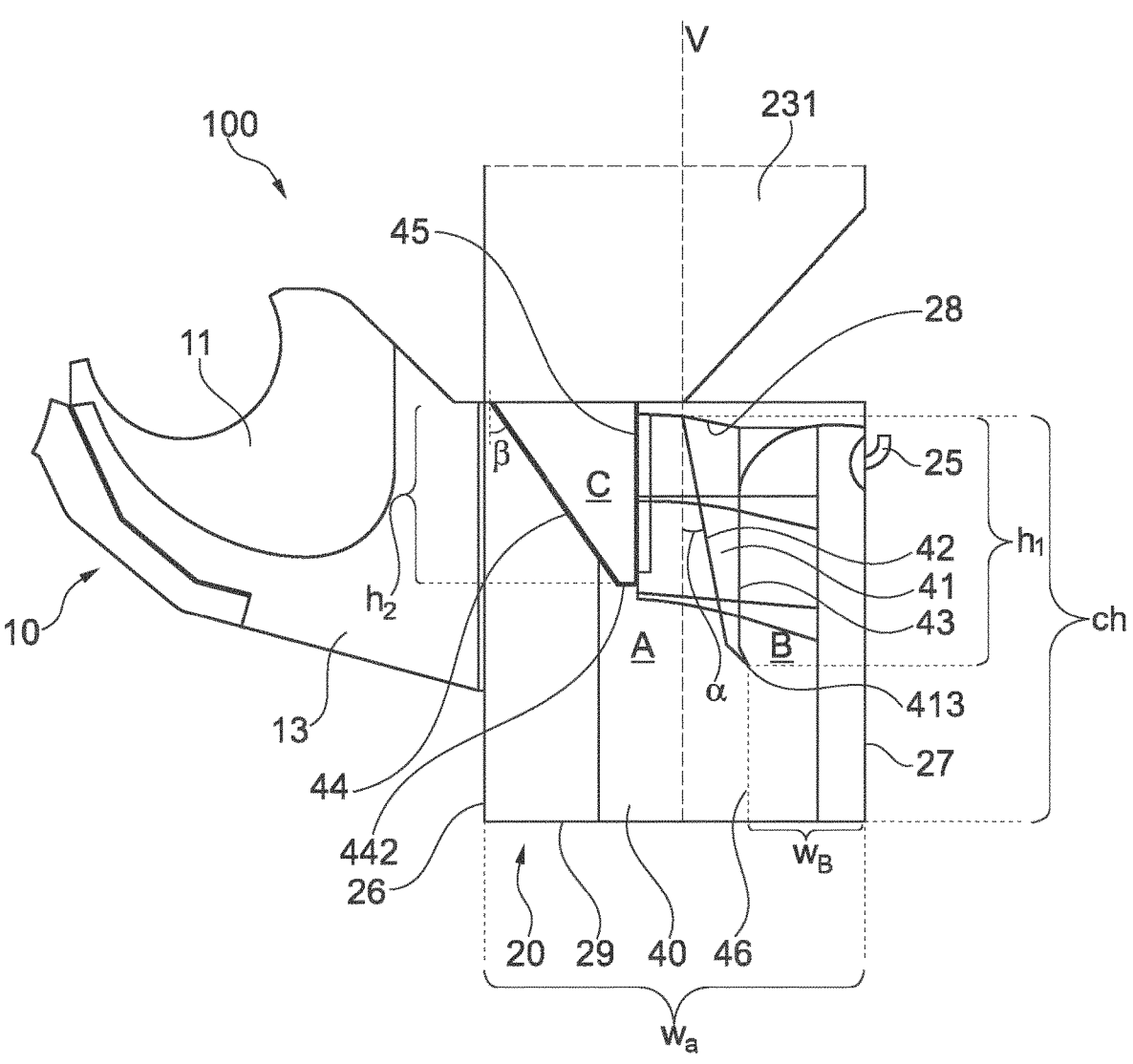
Figure 4:
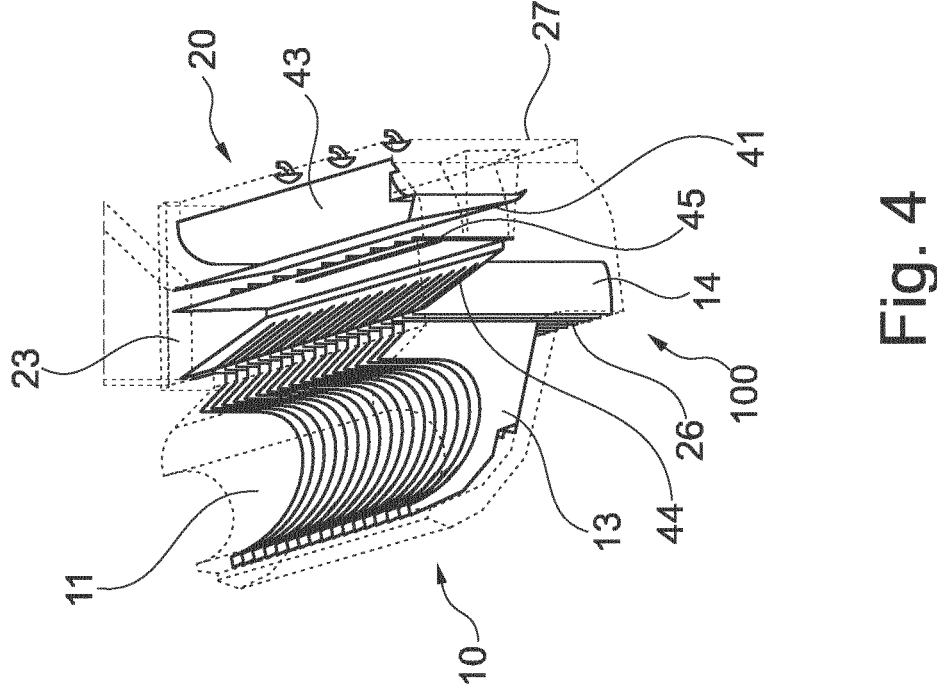
Figure 3:
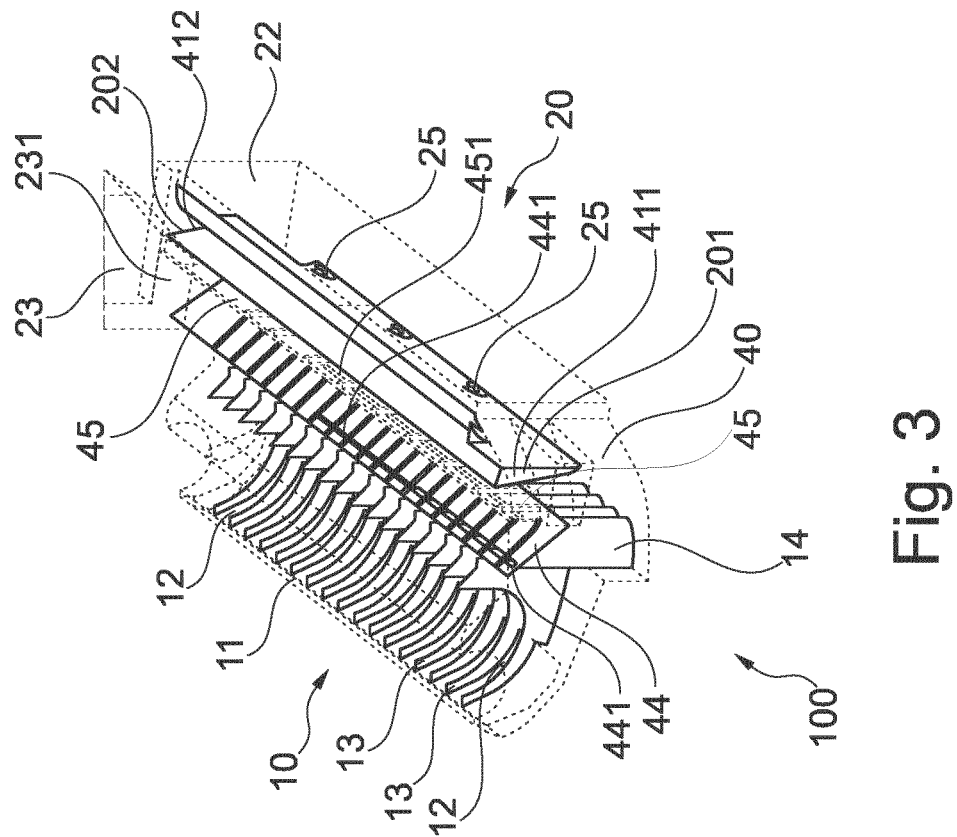
Figure 5:
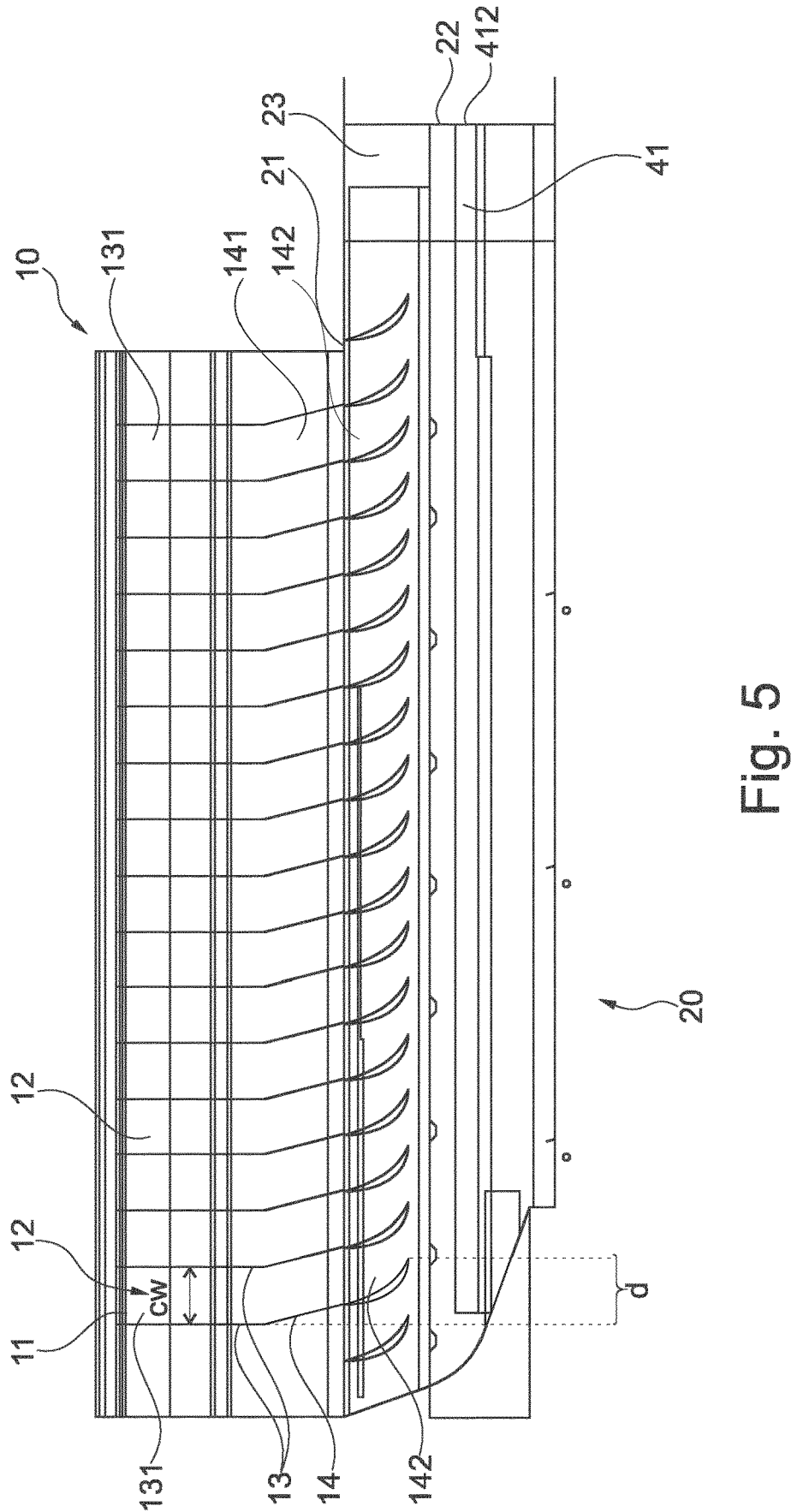
Figure 7:
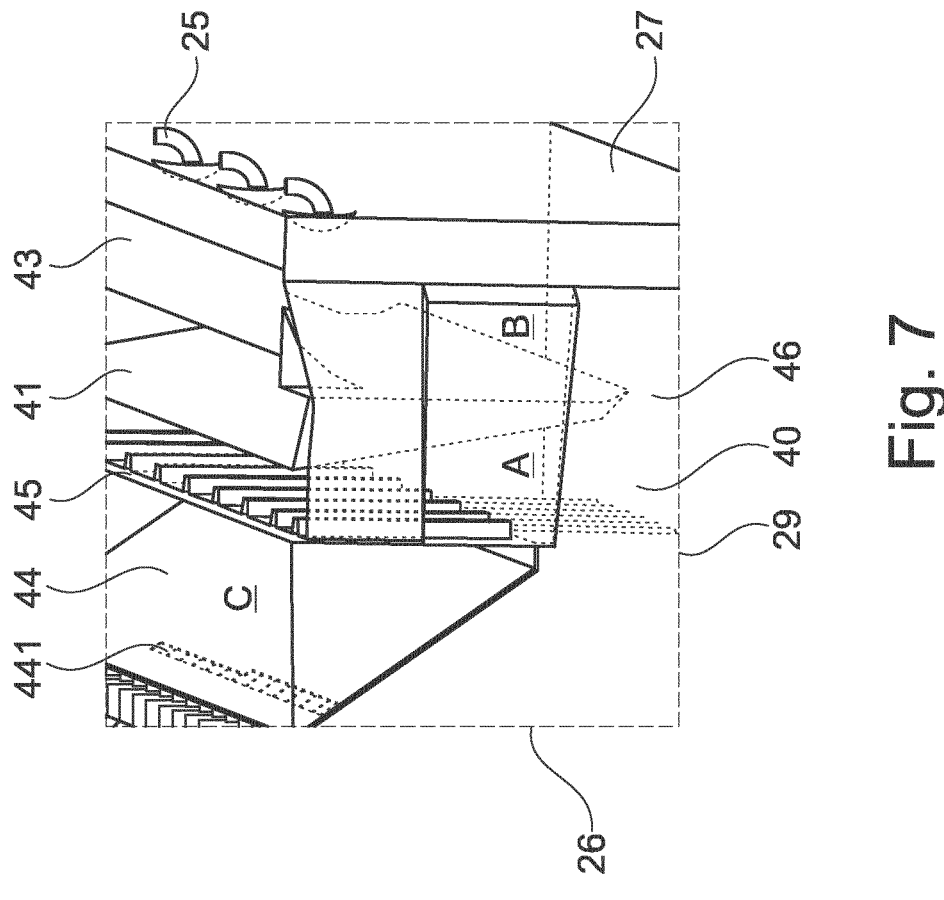
Figure 6:
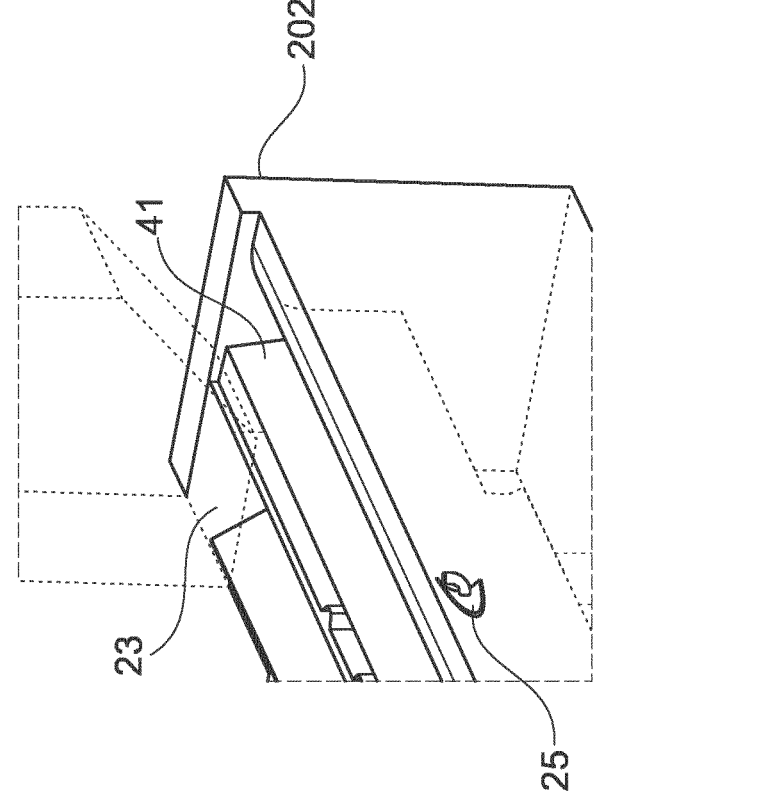
Figure 8:
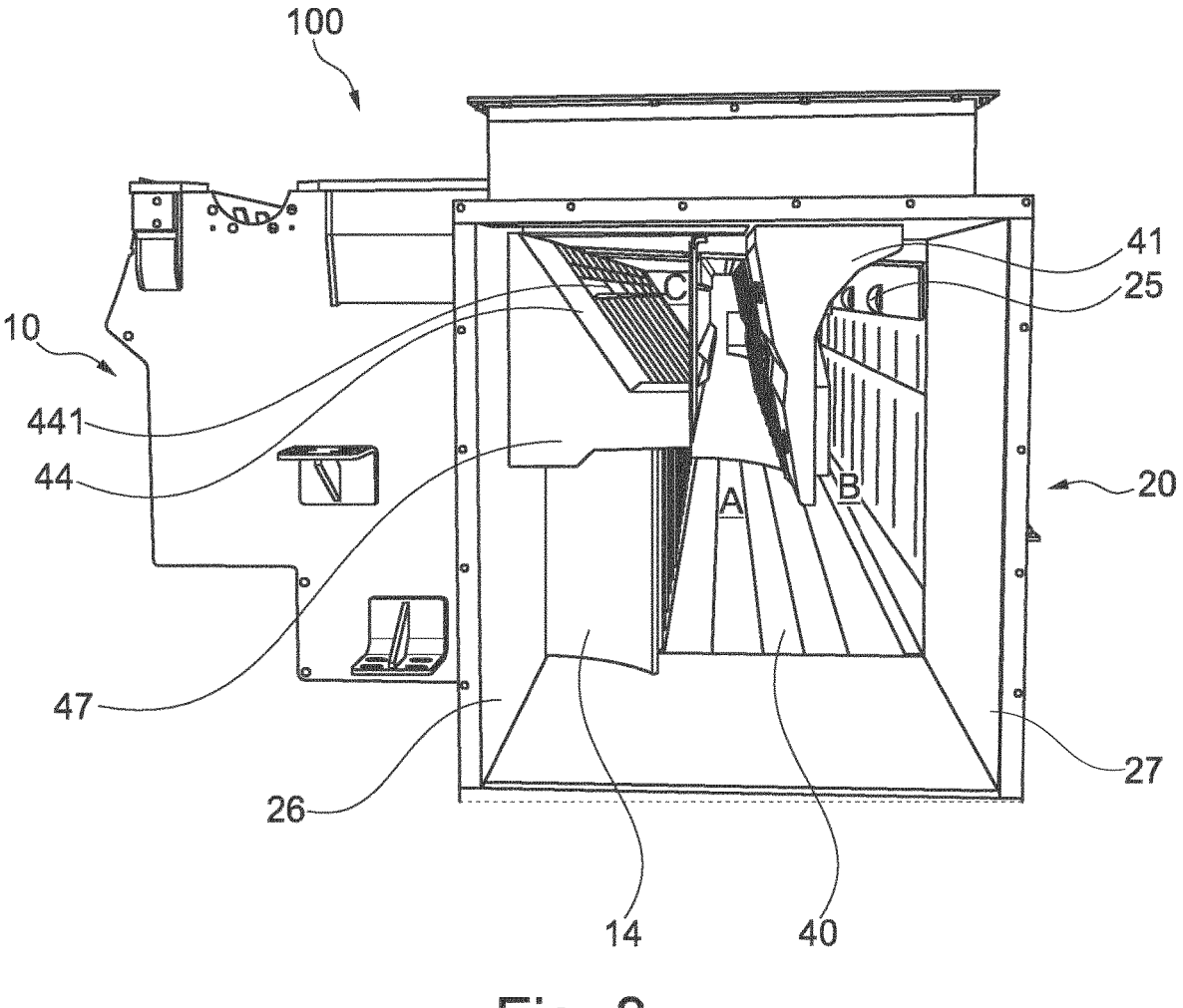
Figure 9:
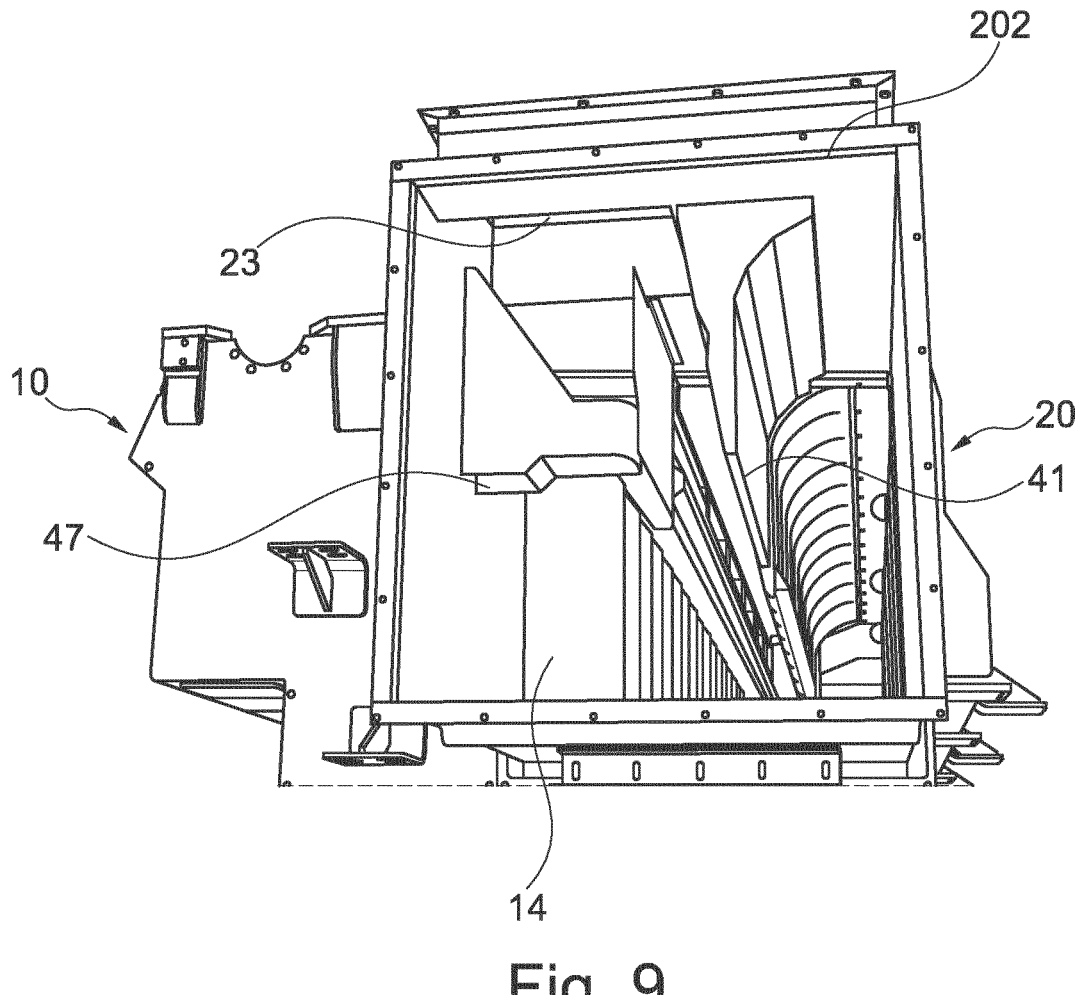
Figure 10:
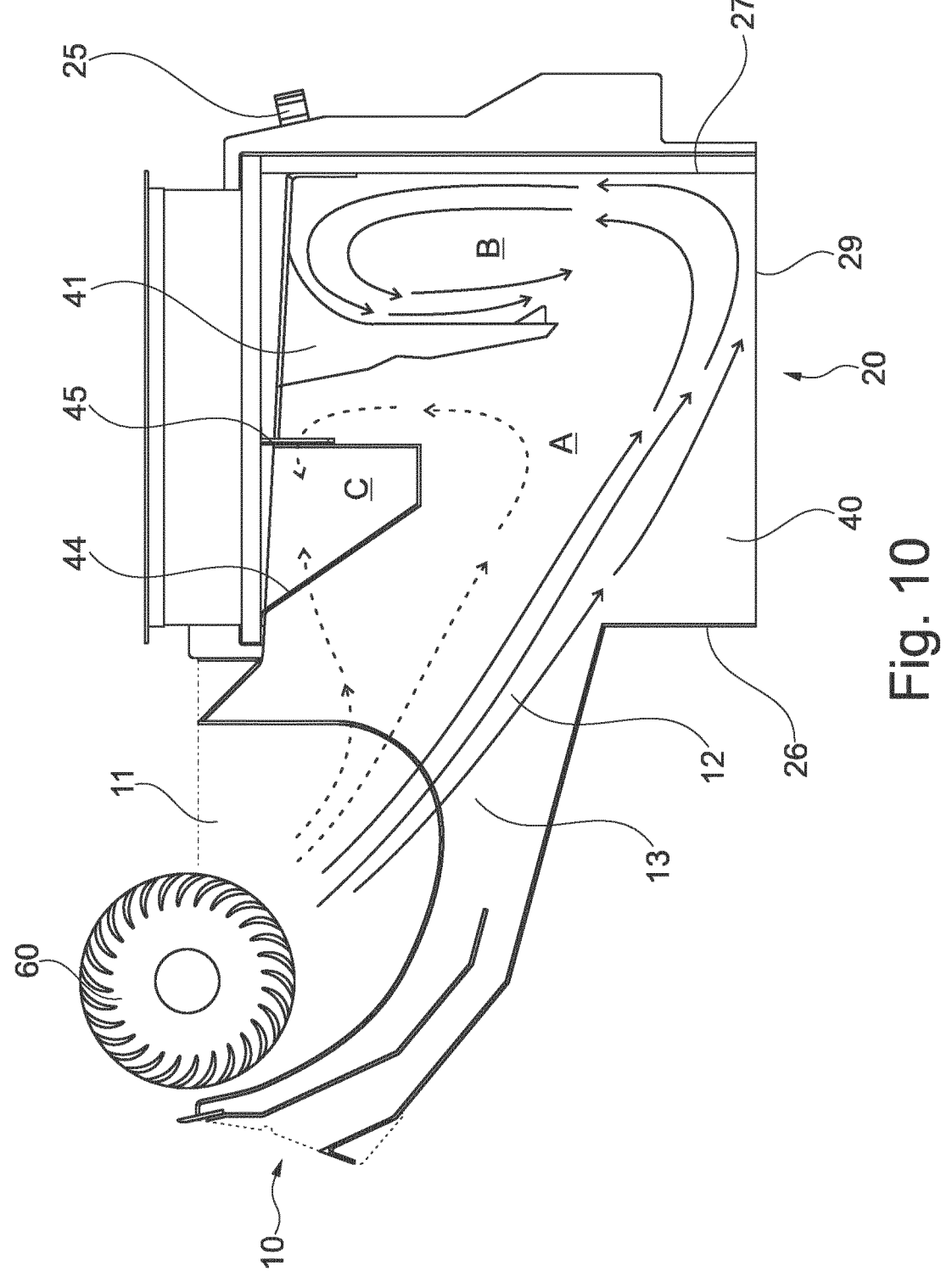

The invention will now be described in more detail with reference to the appended drawings, wherein FIG. 1 discloses a perspective view of a water and air separation device according to a first embodiment of the invention;

FIG. 2 discloses the water and air separation device of FIG. 1 in a planar view from a first end;

FIG. 3 discloses a perspective view from above of the water and air separation device of FIG. 1;

FIG. 4 discloses a perspective view from above of the water and air separation device of FIG. 1;

FIG. 5 discloses a planar view from above of the entry portion of the water and air separation device of FIG. 1, FIG. 6 discloses a perspective view from above of a second end of the water and air separation device of FIG. 1, FIG. 7 discloses a perspective view from above of the first end of the water and air separation device of FIG. 1, FIG. 8 discloses a perspective view from the second end of the water and air separation device of FIG. 1, FIG. 9 discloses a perspective view from a lower end of the second side of the water and air separation device of FIG. 1, and FIG. 10 discloses a planar view from the first end of the water and air separation device of FIG. 1 showing flow of water and of air.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

In the following, a water and air separation device 100 according to the present invention will be described with reference to various embodiments.

The water and air separation device 100 is a handling device suitable for receiving whitewater spray from a forming section of a paper machine during production of paper, board or tissue.

Since machines and processes for manufacturing paper, board or tissue are well known within the art, this will not be described in detail herein. Suffice it to say that a headbox commonly injects stock into a nip formed in a forming section of the paper machine and that whitewater from the stock, after passing the nip, is ejected through a forming wire at high speed together with an air flow that is created by movement of rolls that are pressed against each other in the nip. The resulting whitewater spray that comprises the whitewater mixed with air and the air flow are captured by the water and air separation device 100 as will be described in more detail below and may optionally also pass a turbine immediately before entering the water and air separation device 100 in order to recover kinetic energy from the whitewater.

Whitewater is defined herein as water and particles from the stock that do not adhere to the forming fabric after the forming nip and that therefore are ejected from the forming fabric and forming wire. Typically, the particles in the whitewater are cellulose but there may also be other particles and fragment from other material that have been present in the stock. The term whitewater as used herein also includes air that is mixed with the water so that the water together with the air form a liquid holding air bubbles.

Whitewater spray is defined herein as whitewater and an airflow that are sprayed together from the forming section and that or flow together into the water and air separation device 100. The air of the whitewater spray is unbound air that forms an airflow that is transported together with the whitewater but that is not so thoroughly mixed with the whitewater so as to form part of a liquid but that are instead two separate fluids, whitewater and air, that flow together but that each retain their separate properties.

For the water and air separation device of the present invention, the terms upstream and downstream are defined in relation to a flow of whitewater in the device during use. This means that a component being located upstream will be a component that the whitewater passes before arriving at another component that is located downstream.

FIG. 1 discloses the water and air separation device 100 according to a first embodiment of the present invention, comprising an entry portion 10 with an elongated receiving inlet 11 that is typically placed in connection with the forming section of the paper machine when in use. The receiving inlet 11 suitably has a length that is at least a width of the web formed on the forming fabric and forming wire in the paper machine, so depending on the paper machine with which the water and air separation device 100 is used the length of the receiving inlet 11 may vary. The main objective of the receiving inlet 11 is however to be able to receive as much as possible of the whitewater spray that is ejected from the forming section.

The water and air separation device 10 also comprises a guide portion 20 that is connected to the entry portion 10 so that whitewater spray entering the receiving inlet 11 is transported into a separation chamber 40 inside the guide portion 20. For this purpose, the guide portion 40 comprises an inlet 21 in a front side 26 of a housing 24 and the inlet 21 is connected to the receiving inlet 11 of the entry portion 10 such that whitewater may be transported into the separation chamber 40. A plurality of guide channels 12 are provided that extend from the receiving inlet 11 through the inlet 11 of the guide portion 20 and into the separation chamber 40 and each of the guide channels comprises a deflected downstream portion 142 that serves to deflect the whitewater spray in order to guide it through guide channel outlets 15 towards a liquid outlet 22 through which whitewater is discharged from the guide portion 20. Suitably, the liquid outlet 22 is connected to a calming section 30 as shown in FIG. 1, but in some embodiments the liquid outlet 22 could instead be connected to another component for receiving the whitewater such as a pipe, a conduit, or any other suitable component.

The guide channels are delimited by guide channel walls 13 that in the first embodiment comprise a deflected downstream portion 142 as will be described in detail further below (see FIG. 5).

The guide portion 20 also comprises a gas outlet 23 for removing air from the guide portion 20, suitably connected to a chimney 231 or other channel or conduit for transporting air from the guide portion 20 in a reliable and convenient way.

Inside the separation chamber 40 of the guide portion 20 is also provided a first separation plate 41 that extends downwards in the separation chamber 40 from an upper end 28. The first separation plate 41 may in some embodiments be attached to an inner wall of the housing 24 but may in other embodiments be integrated with the housing 24 or may be mounted on another part of the guide portion 20 as long as the first separation plate 41 is able to extend into the separation chamber 40. The first separation plate 41 is elongated and extends from a first plate end 411 at a first end 201 of the separation chamber 40 towards a second end 202 of the separation chamber 40. In some embodiments, the first separation plate 41 may extend all the way to the second end 202, but in other embodiments the separation plate 41 may instead have an end 412 that is at a distance form the second end 202. The first end 201 is an upstream end of the separation chamber 40 between the front side 26 and the rear side 27. The second end 202 is a downstream end of the separation chamber opposite to the first end 201. Thus, the first end 201 is closer to the inlet 21 than the second end 202 is.

In the first embodiment of FIG. 1, a second separation plate 44 is also provided inside the separation chamber 40 and configured to extend along the inlet 21 across the outlets 15 from the guide channels 12. A sealing plate 45 is in this embodiment also attached to a lower end of the second separation plate 44, and each of the second separation plate 44 and the sealing plate 45 are mounted to the upper end 28 of the separation chamber 40 in a manner similar to the first separation plate 41.

Also provided with the water and air separation device 100 is at least one but preferably a plurality of additional inlets 25 through which whitewater spray that has not been captured by the receiving inlet 11 but instead has reached an upper side of the housing 24 may be introduced into the separation chamber 40.

FIG. 2 discloses the water and air separation device 100 seen from the first end 201 and shows the first separation plate 41 extending inside the separation chamber 40 to delimit a first section A and a second section B. The first section A is adjacent to the inlet 21 in the front side 26 and the second section B is instead adjacent to a rear side 27 that is opposite the front side 26. Between the first section A and the second section B, a connecting passage 46 is formed underneath the first separation plate 41 to allow whitewater to enter the second section B. The gas outlet 23 is operatively connected to at least the first section A in such a way that air can flow from the first section A to the gas outlet 23.

The first separation plate 41 has a front face 42 that faces the front side 26 of the guide portion 20 and that is arranged at a first angle α to a vertical axis V. The first angle α is in a range of 5-45°, preferably 10-20°. This is in order of providing sufficient strength of the first separation plate 41 so that damage due to whitewater entering the inlet 21 and hitting the front face 42 can be decreased or even minimized. The first angle α may differ within the range given above and may be adjusted taking into account a flow direction of the whitewater as it exits the guide channels 12 so that as much as possible of the whitewater is admitted into the connecting passage 46 and suitably without hitting the front face 42 of the first separation plate 41. For this purpose, it is also suitable that a first height $h_1$ of the first separation plate 41 in a vertical direction along the vertical axis V is in the range 0.5-0.9 times a chamber height ch, preferably in the range 0.6-0.7 times the chamber height ch.

The vertical axis V is an axis that is vertical when the guide portion 20 is in a position with a lower side 29 of the guide portion 20 facing downwards, i.e. an axis that is substantially vertical when the guide portion is arranged to be used in connection with a paper machine.

The first separation plate 41 is in the first embodiment attached to a rear plate 43 that extends from a lower end 413 of the first separation plate 41 to the upper end 28 of the separation chamber 40. In some embodiments, the first separation plate 41 and the rear plate 43 may be integrated or may comprise a single structure that has a front face shaped as the front face 42 of the first separation plate 41 of FIG. 1 and a rear face shaped as the rear plate 43 of FIG. 1. Other designs of the first separation plate 41 are also possible within the scope of the present invention.

The rear plate 43 is suitably curved so that whitewater that hits the rear side 27 of the separation chamber 40 and is deflected upwards towards the upper end 28 is then guided along the curved rear plate 43 back down towards the lower side 29. This allows for a handling of the whitewater that decreases wear on the first separation plate 41. Suitably, the lower end 413 of the first separation plate 41 is also curved or angled towards the rear side 27 so that the whitewater is further guided down towards the rear side 27.

As shown in FIG. 2, the additional inlet or inlets 25 is/are provided in an upper part of the second section B so that additional whitewater that has not entered the water and air separation device 100 through the receiving inlet 11 may be inserted into the second section B. Suitably, the additional inlet(s) is/are 25 arranged at an angle to a direction of flow of whitewater in the second section B so that the whitewater may be sucked into the second section B by the flow of whitewater already present inside. Additional inlets may have cover for preventing undesired discharge from the separation chamber 40 through the additional inlets 25. In the first embodiment shown herein, the additional inlets 25 are angled to have their openings into the separation chamber facing the liquid outlet 22.

The separation chamber 40 has an average width $w_a$ from the front side 26 to the rear side 27, and the second section B has an average second section width $w_B$ from the connecting passage 46 to the rear side 27 that is 0.05-0.6 times the average width $w_a$. In various embodiments of the present invention, the average second section width $w_B$ of the second section B may be adapted depending on dimensions of the guide portion 20 and of the water and air separation device 100 as a whole, and also on magnitude of the flow of whitewater that the water and air separation device 100 will be used with. In some embodiments, the main criterion for deciding on the average second section width $w_B$ of the second section B is that the flow of whitewater that enters the separation chamber 40 can pass into the second section and flow in a suitable way as will be explained below with reference to FIG. 10.

In the first embodiment shown in FIG. 2, a second separation plate 44 is also provided and is arranged to protrude from the upper end 28 in the first section A. Suitably, the second separation plate 44 is arranged in connection with the downstream ends of the guide channels 12 and covers an upper portion of the inlet 21, i.e. the outlets 15 from the guide channels 12 so that the whitewater spray that hits the second separation plate 44 is deflected downwards in the first section A of the separation chamber 40. This is advantageous in ensuring that the flow of whitewater is guided into the connecting passage 46 to the second section B, and for this purpose it is also a benefit that the second separation plate 44 has a second height $h_2$ along the vertical axis V that is smaller than the first height $h_1$ of the first separation plate 41. It is also advantageous if the second separation plate 44 is at a second angle $\beta$ to the vertical axis V where the second angle $\beta$ is in a range of 10-60°, preferably 30-50°. It is also advantageous if the second angle $\beta$ is larger than the first angle $\alpha$ so that whitewater is efficiently deflected down towards the connecting passage 46 underneath the first separation plate 41. By providing the second separation plate 44 at the second angle $\beta$, whitewater coming into contact with the second separation plate 44 will be deflected downwards into the separation chamber 40 and prevent turbulence that would otherwise be caused by whitewater flowing back upstream towards the inlet portion 10.

The second separation plate 44 is connected to a sealing plate 45 that extends from the upper end 28 of the separation chamber 40 and that is joined to the second separation plate 44 at a lower end 442 thereof. The second separation plate 44 and the sealing plate 45 may be made from two separate plates that are joined together by any suitable means or may instead be made from a single structure or be integrated with the housing 28 or designed in any other suitable way. Delimited by the second separation plate 44 and the sealing plate 45 a third section C is formed. In some embodiments the third section C may also be delimited by the upper end 28 of the separation chamber 40, but in other embodiments the third section C may instead be connected at its upper end to an elongated gas outlet or any other space or conduit in which air can be transported. The third section C is also arranged in fluid communication with the gas outlet 23 so that air in the third section C can be transported from the guide portion 20 through the gas outlet 23.

FIG. 3 and FIG. 4 disclose the water and air separation device 100 from above, in order to show both the guide channels 12 delimited by channel walls 13 and the second separation plate 44 and sealing plate 45 more clearly. The second separation plate 44 in this first embodiment comprises a plurality of plate openings 441 through which the whitewater spray, and in particular air of the whitewater spray may be admitted into the third section C from the guide channels 12. Also, the sealing plate 45 comprises a plurality of second plate openings 451 through which air of the whitewater spray in the first section A is admitted into the third section C. In some embodiments, at least the plate openings 441 but optionally also the second plate openings 451 are adjustable, for instance by a plate section without openings being movable along the second separation plate 44 and optionally also along the sealing plate 45, or else by a plate section having matching openings being movable so that the plate openings 441, 451, may be completely open, completely closed or partially open by the openings of the plate section matching the openings of the second separation plate 44 and optionally of the sealing plate 45 completely, not at all, or partially. Also, in some embodiments all of the plate openings 441, 451 may be adjustable whereas in other embodiments all of the plate openings 441, 451 are. In some embodiments, either the second separation plate 44 or the sealing plate 45 or both may lack openings so that the air flow is directed into the third section C through either the second separation plate 44 or the sealing plate 45 or so that the airflow is held in the first section A.

The gas outlet 23 is operatively connected to both the first section A and the third section C to form a fluid connection in which air can flow, but in some embodiments the gas outlet 23 could instead be in fluid communication with only the first section A. In embodiments comprising both the first section A and the third section C, the first section A may also be in fluid communication with the gas outlet 23 through the third section C.

FIG. 3-4 discloses the guide channels 12 with the channel walls 13 and the deflected downstream portion 142 in a downstream end of the guide channels 12 provided inside the separation chamber 40 or in connection with the separation chamber 40. In the first embodiment, the guide channels 12 are made from a plurality of plates that are spaced apart to form the channel walls 13. The plurality of plates may be arranged parallel to each other or may be arranged in any other way as long as guide channels 12 are formed so that the whitewater spray if able to pass along the guide channels 12 into the separation chamber 40. In some embodiments, the plurality of plates may be arranged essentially vertically, i.e. parallel to the vertical axis V, but in other embodiments the plurality of plates may instead be arranged at an angle to the vertical axis V. Also, the plurality of plates may be flat or curved and may form channels that have a rectangular cross-section, a triangular or round cross-section, or a honeycomb cross-section or any other suitable shape. Also, in some embodiments the guide channels 12 may instead be formed by pipes or tubes that are arranged together to form the plurality of guide channels 12.

In the first embodiment, it is advantageous that the guide channels 12 are arranged side by side but without guide channels 12 on top of each other. This has the benefit that the guide channels 12 are rendered elongated in the vertical direction so that the whitewater spray is able to flow along the guide channels 12 with the whitewater near a bottom of the guide channels 12 and the free air from the whitewater spray above the whitewater due to differing densities of the whitewater and the air. This is particularly advantageous in improving the passing of the whitewater into the connecting passage 46 and preventing the air from following into the second section B.

FIG. 5 discloses the entry portion 10 from above, showing more clearly the guide channels 12 and the channel walls 13 that delimit them. Each of the guide channels 12 has a channel width cw in an upstream portion 131 and in some embodiments the channel width cw is the same for each of the guide channels 12 but in other embodiments the channel width cw may instead vary so that some guide channels 12 are wider than others. Also, in some embodiments the channel width cw may be constant along one guide channel 12 from the upstream portion 131 to a downstream portion 141 but in another the channel width cw of a guide channel 12 may instead vary.

In the downstream portion 141, a deflected downstream portion 142 is formed in which at least one of the guide channel walls 13 is deflected, i.e. proceeds in a direction that is at an angle to a guide channel wall 13 in the upstream portion 131. The purpose of the deflected downstream portion 142 is to deflect the flow of whitewater spray so that it is directed towards the rear side 27 at an angle rather than hitting the rear side 27 in a direction that is perpendicular to the wall of the rear side 27. This is advantageous in calming the whitewater spray and directing it towards the liquid outlet 22 so that the discharge of whitewater through the liquid outlet 22 is facilitated and the calming of the whitewater in a subsequent calming section 30 downstream of the guide portion 20 is improved.

The deflected downstream portion 142 of the guide channel wall is configured to deflect a distance d in a transversal direction, i.e. a direction that is perpendicular to a longitudinal direction that is also a flow direction in the upstream portion 131 of the guide channels 12, and it is advantageous if this distance d equal to or larger than the channel width cw of the guide channel 12. This has the benefit of ensuring that the entire flow of whitewater spray and in particular the flow of whitewater is deflected. The deflected downstream portion 142 of the guide channel wall 13 may be integrated with the rest of the guide channel wall 13 or may alternatively be formed by a separate section 14 that is fastened to the guide channel wall 13 of the upstream portion. It is advantageous to ensure the strength of the guide channel wall 13 to avoid joins along the length of the guide channel wall 13, but in some embodiments, it is also advantageous to provide a material for the deflected downstream portion 142 having a higher strength than the upstream portion of the guide channel wall 13 to be able to withstand the force of the whitewater hitting the deflected downstream portion 142.

As can also be seen in FIG. 3-5, the gas outlet 23 and the first separation plate 41 are arranged in relation to each other so that the end 412 of the separation plate 41 is closer to the second end 202 of the guide portion 20 than the gas outlet 23, or at least that the end 412 of the separation plate 41 is equally close to the second end 202 as the gas outlet 23. This is advantageous in ensuring that whitewater in the second section B is prevented from entering the gas outlet 23. This is also shown more clearly in FIG. 6, where the gas outlet 23 is shown in particular in relation to the first separation plate 41.

FIG. 7 discloses the second separation plate 44 with the plate openings 441 and the sealing plate 45 that together form the third section C. Also, the first section A is shown delimited by the inlet 21, the second separation plate and sealing plate as well as the first separation plate 41 and the lower end 29 of the separation chamber 40. Furthermore, FIG. 7 discloses the second section B delimited by the rear plate 43, the rear side 27 and the lower end 29. As is also shown in FIG. 3-5 and FIG. 6, each of the first, second and third sections A, B, C extend from the first end 201 of the guide portion 20 towards the second end 202 of the guide portion 20 so that elongated sections are formed in which whitewater spray is transported to the liquid outlet 22 and the gas outlet 23. During use, the second section B will hold mainly whitewater into which air is mixed, whereas the third section C will hold mainly air and the first section A will hold both whitewater and air. When the whitewater spray enters the water and air separation device 100, there will be some air mixed into the whitewater but also an air stream that forms part of the whitewater spray but that is not actually mixed into the whitewater in such a way that separation of whitewater and the airflow is prevented. By the design of the separation chamber 40 inside the guide portion 20, the air stream of the whitewater spray is separated from the whitewater and the air mixed into the whitewater. This aids in removing most of the total amount of air present in the whitewater spray and renders separation in the calming section 30 easier and more efficient since it will only be necessary in the calming section 30 to separate air that is mixed into the whitewater from the whitewater itself. Thus, whereas many guide portions according to the prior art actually provide a more thorough mixing so that the whitewater will contain more air after passing the guide portion than it previously did, the present invention is capable of removing the large quantities of air in the whitewater spray that is not mixed into the whitewater itself.

FIG. 8 discloses the entry portion 10 and the guide portion 20 from the second end 202, showing in particular the configuration of the first separation plate 41 and the second separation plate 44 with the first, second and third sections A, B, C. Also, FIG. 8 discloses a drain 47 from the third section C that allows whitewater that has entered the plate openings 441 or second plate openings 451 to exit the third section C.

FIG. 9 also discloses the water and air separation device 100 from the second end 202 of the guide portion 20 and more clearly shows both the drain 47 and the gas outlet 23. It is advantageous that the drain 47 is provided closer or at least at an equal distance to the second end 202 as compared with the gas outlet 23 so that fluid is drained from the third section C downstream of where air is removed from the guide portion 20.

FIG. 10 discloses the water and air separation device 100 according to the first embodiment with flow of water shown as arrows and flow of air shown as dashed arrows. Also provided is a turbine 60 that in some embodiments may be arranged in connection with the receiving inlet 11 so that whitewater spray that has passed the turbine 60 is allowed to enter the receiving inlet 11.

The whitewater will flow at a lower part of each guide channel 12 and enter the separation chamber 40 near its lower end 29. After passing through the connecting passage 46, the whitewater is then deflected up along the rear wall 27 and guided back down along the curved side of the first separation plate 41. At the same time, air of the whitewater spray will pass in an upper part of each guide channel 12 and some air will pass into the third section C through the plate openings 441 while some air will instead pass into the first section A and be deflected upwards along the first separation plate 41 and enter the third section C through the second plate openings 451. There may also be small quantities of air that enter the first section A and remain there, or that enter the third section C through the second plate openings 451 closer to the second end 202 of the guide portion 20.

In some embodiments, the air may be urged to leave the guide portion 20 through the gas outlet 23 by air transport means such as a fan or the like being provided in connection with the gas outlet 23 or further inside the chimney or conduit 231. However, in other embodiments the air may instead exit the guide portion 20 without being forced by air transport means and may instead flow due to the entry of further whitewater spray entering the separation chamber 40 through the inlet portion 10.

It is to be noted that features from the various embodiments described herein may freely be combined, unless it is explicitly stated that such a combination would be unsuitable.

The invention claimed is:

1. Water and air separation device for removing air from a whitewater spray ejected from a forming wire in a forming section of a paper machine, the water and air separation device (100) comprising:

an entry portion (10) having a receiving inlet (11) for receiving whitewater spray comprising whitewater and air, a guide portion (20) for guiding whitewater from the entry portion to a calming section, the guide portion (20) comprising:

a housing (24), a separation chamber (40) in the housing, an inlet (21) in a front side (26) of the housing, a plurality of guide channels (12) that extend from the receiving inlet (11) of the entry portion (10) into the separation chamber (40) through the inlet (21) of the guide portion (20) for transporting whitewater spray into the separation chamber, wherein each of the plurality of guide channels (12) comprises a deflected downstream portion (142) for deflecting the whitewater spray, a liquid outlet (22) connected to the housing (24) for discharging whitewater from the separation chamber, and a gas outlet (23) connected to the housing (24) for allowing air to escape from the separation chamber, and wherein:

the guide portion (20) further comprises a first separation plate (41) arranged to extend from an upper end (28) of the separation chamber (40) downwards into the separation chamber (40) and to divide the separation chamber (40) into a first section (A) adjacent to the front side (26) and a second section (B) adjacent to a rear side (27) that is opposite to the front side (26), the first separation plate (41) having a front face (42) facing the front side (26) of the separation chamber (40), said front face (42) extending at a first angle (α) in relation to the vertical axis (V), the guide portion (20) further comprises a second separation plate (44) that is arranged from the upper end (28) of the separation chamber (40) to extend at a second angle in relation to the vertical axis (V) and downwards into the first section (A), the second angle being greater than the first angle so that whitewater coming into contact with the second separation plate (44) is deflected into the separation chamber (40), and the first separation plate (41) has a first height (h1) along a vertical axis (V) that is smaller than a chamber height (ch) of the separation chamber (40) along the vertical axis, so that a connecting passage (46) is formed for allowing whitewater to pass into the second section (B) underneath the first separation plate (41) and thereby separate the whitewater from air of the whitewater spray.

2. The water and air separation device of claim 1, wherein the first height (h1) of the first separation plate (41) is 0.5-0.9 times the chamber height (ch).

3. The water and air separation device of claim 1, wherein said first angle (α) is in a range of 5-45° and the second angle (β) is in a range of 10-60°.

4. The water and air separation device of claim 1, wherein the separation chamber (40) has an average width (w$_a$) from the front side (26) to the rear side (27), and wherein the second section (B) has an average second section width (w$_B$) of 0.05-0.6 times the average width (w$_a$) of the separation chamber (40).

5. The water and air separation device of claim 1, wherein the second separation plate (44) further extends across an upper portion of outlets (15) of the guide channels (12) along the front side (26).

6. The water and air separation device of claim 1, wherein the second separation plate (44) comprises a plurality of plate openings (441) for admitting air through the second separation plate (44).

7. The water and air separation device of claim 6, wherein at least some of the plurality of plate openings (441) are adjustable.

8. The water and air separation device of claim 1, wherein the second separation plate (44) has a second height (h2) along the vertical axis (V) that is smaller than the first height (h$_1$) of the first separation plate (41).

9. The water and air separation device of claim 1, wherein the guide portion (20) further comprises a sealing plate (45) arranged from the upper end (28) of the separation chamber (40) to extend downwards into the first section (A) and to join the second separation plate (44) to form a third section (C) delimited by the second separation plate (44) and the sealing plate (45) and wherein the third section (C) is in fluid communication with the gas outlet (23).

10. The water and air separation device according to claim 9, wherein: the second separation plate (44) comprises a plurality of plate openings (441) for admitting air through the second separation plate (44); and the third section (C) comprises a drain (47) for draining whitewater from the third section (C), said drain (47) being arranged at a distance from the inlet (21) of the guide portion (20).

11. The water and air separation device according to claim 9, wherein the sealing plate (45) further comprises a plurality of second plate openings (451) for admitting air into the third section (C).

12. The water and air separation device according to claim 1, wherein each of the guide channels (12) have a guide channel width (cw) in an upstream portion (131) in the entry portion (10), and wherein the deflected downstream portion (142) of each channel (12) is formed by a deflected portion (14) of a guide channel wall (13) in the downstream portion (142) that is deflected in a transversal direction at least the guide channel width (cw).

13. The water and air separation device according to claim 1, wherein the plurality of guide channels (12) is formed by a plurality of plates that are spaced apart from each other.

14. The water and air separation device according to claim 1, wherein the plurality of guide channels (12) is formed by a plurality of pipes or tubes.

15. The water and air separation device according to claim 1, wherein the housing (24) of the guide portion (20) further comprises at least one additional inlet (25) in the second section (B) of the separation chamber (40) for introducing additional whitewater from outside the housing (24) into the separation chamber (40).

16. The water and air separation device according to claim 1, further comprising a turbine (60) that is arranged in connection with the receiving inlet (11) of the entry portion (10) so that whitewater spray that passes the turbine (60) is received by the receiving inlet (11).

17. The water and air separation device according to claim 1, wherein the first separation plate (41) is attached to a rear plate (43) that extends from a lower end (413) of the first separation plate (41) to the upper end (28) of the separation chamber (40), and wherein the rear plate (43) is curved.

18. The water and air separation device according to claim 1, wherein the separation chamber (40) has a first end (201) and a second end (202), said first end (201) being adjacent to the inlet (21) between the front side (26) and the rear side (27) and upstream of the second end (202), and wherein the liquid outlet (22) and the gas outlet (23) are closer to the second end (202) than to the first end (201), and wherein further the first separation plate (41) extends across the separation chamber (40) from the first end (201) towards the second end (202) at least to the gas outlet (23).

19. The water and air separation device according to claim 1, further comprising a calming portion (30) connected to the liquid outlet (22) of the guide portion (20) such that whitewater that is discharged through the liquid outlet (22) enters the calming portion (30).

20. Paper machine comprising at least one water and air separation device (100) according to claim 1.

* * * * *